US008966395B2

(12) United States Patent
Park

(10) Patent No.: US 8,966,395 B2
(45) Date of Patent: *Feb. 24, 2015

(54) MOBILE TERMINAL AND CONTROL METHOD THEREOF

(75) Inventor: Seungyong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 753 days.

This patent is subject to a terminal disclaimer.

(21) Appl. No.: 12/915,938

(22) Filed: Oct. 29, 2010

(65) Prior Publication Data

US 2011/0219333 A1 Sep. 8, 2011

(30) Foreign Application Priority Data

Mar. 3, 2010 (KR) .................. 10-2010-0019057
May 12, 2010 (KR) .................. 10-2010-0044284
May 12, 2010 (KR) .................. 10-2010-0044285

(51) Int. Cl.
G06F 3/048 (2013.01)
H04M 1/725 (2006.01)
G06F 3/0484 (2013.01)
G06F 3/0482 (2013.01)
G06F 3/0488 (2013.01)

(52) U.S. Cl.
CPC ....... H04M 1/72583 (2013.01); G06F 3/04842 (2013.01); H04M 2250/22 (2013.01); H04M 2250/16 (2013.01); G06F 3/0482 (2013.01); G06F 3/04883 (2013.01)
USPC ....................................... 715/810

(58) Field of Classification Search
USPC ......................... 715/808, 810, 820
See application file for complete search history.

(56) References Cited

U.S. PATENT DOCUMENTS

| 7,376,913 | B1 * | 5/2008 | Fleck et al. | 715/864 |
|---|---|---|---|---|
| 7,512,952 | B1 * | 3/2009 | Liu et al. | 718/108 |
| 7,643,012 | B2 | 1/2010 | Kim et al. | |
| 8,286,098 | B2 * | 10/2012 | Ju et al. | 715/849 |
| 2005/0223324 | A1 * | 10/2005 | Tashiro | 715/527 |
| 2006/0105753 | A1 * | 5/2006 | Bocking et al. | 455/417 |
| 2007/0055940 | A1 * | 3/2007 | Moore et al. | 715/738 |
| 2007/0185962 | A1 * | 8/2007 | Bocking et al. | 709/206 |
| 2009/0064049 | A1 * | 3/2009 | Pyhalammi et al. | 715/838 |
| 2009/0249222 | A1 * | 10/2009 | Schmidt et al. | 715/751 |
| 2010/0106864 | A1 * | 4/2010 | Li et al. | 710/17 |
| 2010/0162178 | A1 * | 6/2010 | Tuli | 715/863 |

FOREIGN PATENT DOCUMENTS

| KR | 10-2004-0058374 A | 7/2004 |
|---|---|---|
| KR | 10-2004-0078276 A | 9/2004 |
| KR | 10-2004-0099901 A | 12/2004 |
| KR | 10-0672605 B1 | 1/2007 |

* cited by examiner

*Primary Examiner* — Rashawn Tillery
(74) *Attorney, Agent, or Firm* — Birch, Stewart, Kolasch & Birch, LLP

(57) ABSTRACT

A mobile terminal and a control method thereof are discussed. According to an embodiment, the mobile terminal includes a display unit configured to display a plurality of selectable items including a first selectable item and a second selectable item, each of the first and second selectable items corresponding to at least one function to be performed; and a controller configured to receive a user's selection of at least one of the first and second selectable items, to perform the at least one function corresponding to the user's selection, and to maintain at least part of the user's selection even after the at least one function is performed.

16 Claims, 16 Drawing Sheets

MOBILE TERMINAL AND CONTROL METHOD THEREOF

This application claims the priority benefit of Korean Patent Application No. 10-2010-0019057 filed on Mar. 3, 2010, Korean Patent Application No. 10-2010-0044284 filed on May 12, 2010, and Korean Patent Application No. 10-2010-0044285 filed on May 12, 2010, which is hereby incorporated by reference.

BACKGROUND

1. Field of the Invention

The present invention relates to a mobile terminal and a control method thereof, and more particularly, to a mobile terminal and a control method thereof for maintaining a plurality of selected items in a selected state even after the functions corresponding to the selected items are executed and the screen returns to the previous page so as to mitigate the inconvenience of repeatedly selecting an item displayed on a screen of the mobile terminal.

2. Discussion of the Related Art

As functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

Terminals can be divided into mobile terminals and stationary terminals. The mobile terminals can be classified into handheld terminals and vehicle mount terminals according to whether the users can personally carry the terminals.

To support and enhance the functions of a terminal, a structural part and/or a software part of the terminal may be enhanced. As a variety of terminals including the mobile terminals provide complicated and various functions, a menu structure becomes also complicated. Furthermore, a function of displaying digital documents including web pages is added to the functions of the mobile terminals.

SUMMARY

It is an object of the present invention to provide a mobile terminal and a control method thereof for maintaining a plurality of selected items in a selected state even after the functions corresponding to the selected items are executed and then the screen returns to a previous page so as to mitigate the inconvenience of repeatedly selecting an item on the display of the mobile terminal.

It is another object of the present invention to provide a terminal and its control method in which when selectable items (e.g., icons, menu items, buttons, etc.) displayed on the screen of the terminal are selected, function(s) corresponding to the selection are performed and thereafter when the screen returns to the page, the selected items are not displayed as unselected but are displayed still as selected on the screen.

It is another object of the present invention to provide a terminal and method for controlling a selection on a screen, which address the limitations and disadvantages associated with the related art.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

According to an embodiment, the invention provides a mobile terminal comprising: a display unit configured to display a plurality of selectable items including a first selectable item and a second selectable item, each of the first and second selectable items corresponding to at least one function to be performed; and a controller configured to receive a user's selection of at least one of the first and second selectable items, to perform the at least one function corresponding to the user's selection, and to maintain at least part of the user's selection even after the at least one function is performed.

According to an embodiment, the invention provides a method of controlling a display unit of a mobile terminal, the method comprising: displaying, on the display unit, a plurality of selectable items including a first selectable item and a second selectable item, each of the first and second selectable items corresponding to at least one function to be performed; receiving, by the mobile terminal, a user's selection of at least one of the first and second selectable items; performing the at least one function corresponding to the user's selection; and maintaining, by the mobile terminal, at least part of the user's selection even after the at least one function is performed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 8(a) through 16 illustrate various examples of the operation(s) of the mobile terminal shown in FIG. 6 according to an embodiment of the present invention.

DETAILED DESCRIPTION OF THE PREFERRED EMBODIMENTS

Embodiments of the present invention will now be described more fully with reference to the accompanying drawings, in which exemplary embodiments of the invention are shown. The embodiments of the invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to embodiments of the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include, but is not limited to, a cellular phone, a smart phone, a laptop computer, a digital broadcasting terminal, personal digital assistants (PDA), a portable multimedia player (PMP), a portable TV device, a navigation system and so on.

However, those skilled in the art will easily understand that configurations according to embodiments of the present invention can also be applied to stationary terminals such as digital TV and desktop computers except a case where the configurations can be applied to only mobile terminals.

Figure 1:
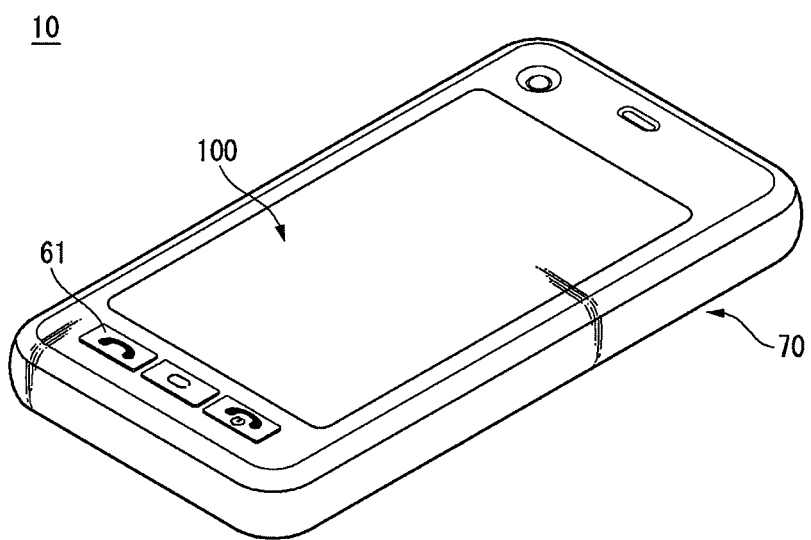
FIG. 1 is a perspective view of a mobile terminal according to an embodiment of the present invention.

FIG. 1 is a perspective view of a mobile terminal 10 according to an embodiment of the present invention.

Referring to FIG. 1, the mobile terminal 10 according to an embodiment of the present invention may include a body 70 and a touch screen 100 attached to one side of the body 70.

The body 70 may form the external appearance of the mobile terminal 10 and protect internal components of the mobile terminal 10 from impact applied to the mobile terminal 10. The body 70 may be formed of a plastic material including engineering plastics or metal including steel to effectively absorb impact, or a combination thereof. The body 70 may be formed from a single molded piece or formed by assembling multiple molded pieces. The body 70 may include various buttons 61, and may include components that are commonly known in mobile terminals.

The buttons 61 may be appropriately disposed on the front face, side and rear face of the body 70 according to design needs. The number of buttons 61 may be adjusted according to design needs. As a variation, the body 70 may not have any physical button.

The touch screen 100 may be attached to at least one side of the body 70. For example, the touch screen 100 may be attached to the front side or the backside of the body 70. As a variation, the touch screen 100 may be attached to both the front side and the backside of the body 70. Moreover, the touch screen 100 may be transparent such that an object behind the mobile terminal 10 can be seen through the touch screen 100. Though the term 'touch screen' is used since the touch screen 100 displays images and receives touch inputs, the touch screen may be referred to as a display. The mobile terminal 10 can further include known components such as an audio output, a controller/processor, a memory, a camera, etc.

Figure 2:
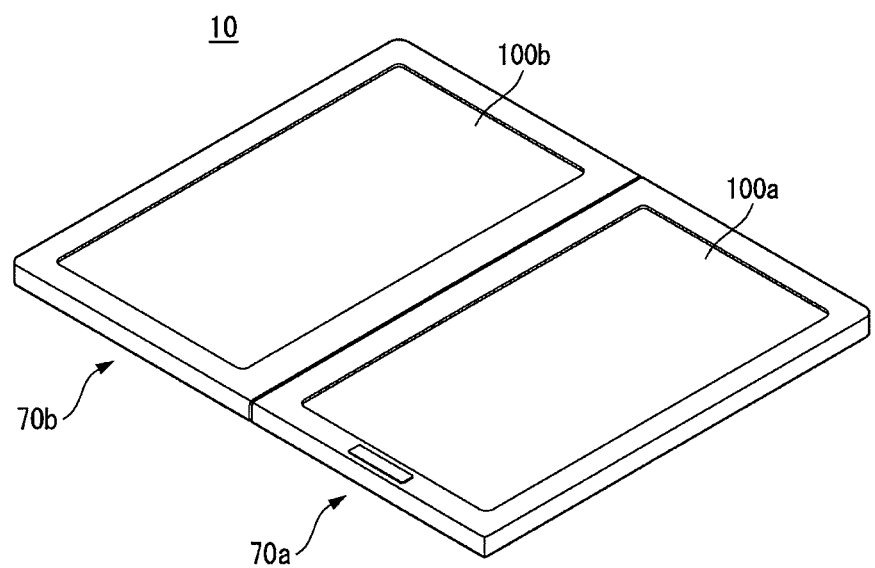
FIG. 2 is a perspective view of a mobile terminal according to another embodiment of the present invention.

FIG. 2 is a perspective view of a mobile terminal according to another embodiment of the present invention.

Referring to FIG. 2, the mobile terminal 10 according to this embodiment of the present invention may include first and second touch screens 100a and 100b respectively mounted in first and second bodies 70a and 70b.

The first and second bodies 70a and 70b may be respectively formed and assembled. For example, the first and second bodies 70a and 70b may be respectively formed in a hexahedral shape. The first and second bodies 70a and 70b may rotate on a hinge to be in a closed status or an open status. The first and second bodies 70a and 70b are folded in the closed status and unfolded and arranged in parallel with each other in the open status. In the open status, a user can view images displayed on a wider screen because the first and second bodies 70a and 70b are unfolded. The mobile terminal 10 of FIG. 2 may also include known components such as an audio output, a controller/processor, a memory, a camera, etc FIG. 3 is a view for explaining an example of a logical division of a display usable in the mobile terminal of the invention.

Figure 3:
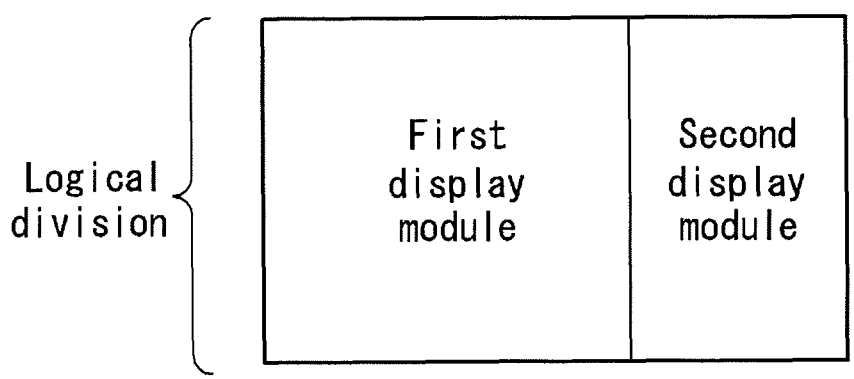
FIG. 3 is a view for explaining an example of a logical division of a display of a mobile terminal according to an embodiment of the invention.

Referring to FIG. 3, a touch screen (e.g., the touch screen 100, 70a, or 70b) may be divided into a plurality of regions in a single display panel. For example, the touch screen can function as multiple touch screens (multiple display modules) logically although the touch screen is in a single body physically. When the touch screen is divided into a plurality of regions, different images can be respectively displayed on the plurality of regions. Furthermore, a touch input applied to one of the plurality of regions can be distinguished from a touch input applied to another region among the regions of the touch screen. The terminal in which the touch screen is disposed can selectively and independently control images displayed in each of the regions of the touch screen.

Figure 4:
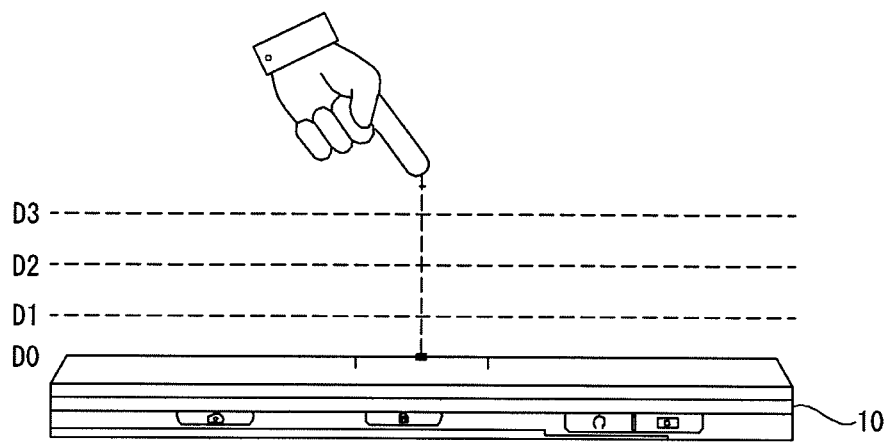
FIG. 4 is a view for explaining an example of a proximity depth of a proximity sensor of a mobile terminal according to an embodiment of the invention.

FIG. 4 is a view for explaining a proximity depth of a proximity sensor which can be used in the mobile terminal of the invention.

As shown in FIG. 4, the proximity sensor may be disposed in an internal region of the mobile terminal 10, which is surrounded by a touch screen, or near the touch screen. The proximity sensor senses a presence or absence of an object approaching a predetermined sensing face or an object disposed in proximity to the sensing face using electromagnetic force or infrared rays without having a direct mechanical contact. The proximity sensor preferably has a lifetime that is longer than that of a contact sensor and is used for a wide range of applications.

Examples of the proximity sensor include a transmitting photoelectric sensor, a direct reflex photoelectric sensor, a mirror reflective photoelectric sensor, a high-frequency oscillating proximity sensor, a capacitance type proximity sensor, a magnetic proximity sensor, an infrared proximity sensor and so on.

In the case of a capacitive touch screen, the proximity sensor is constructed such that it senses proximity of a pointer according to a variation in electric field due to the proximity of the pointer. In this case, the touch screen (touch sensor) may be classified as a proximity sensor.

For convenience of explanation, an action of moving the pointer towards the touch screen while the pointer is not being in contact with the touch screen such that the location of the pointer on the touch screen is recognized, is referred to as "proximity touch" and an action of bringing the pointer into contact with the touch screen is referred to as "contact touch" in the following description. A proximity touch point of the pointer on the touch screen preferably means a point of the touch screen to which the pointer corresponds perpendicularly to the touch screen when the pointer proximity-touches the touch screen.

The proximity sensor senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be processed by the mobile terminal and displayed on the touch screen of the mobile terminal.

Figure 5:
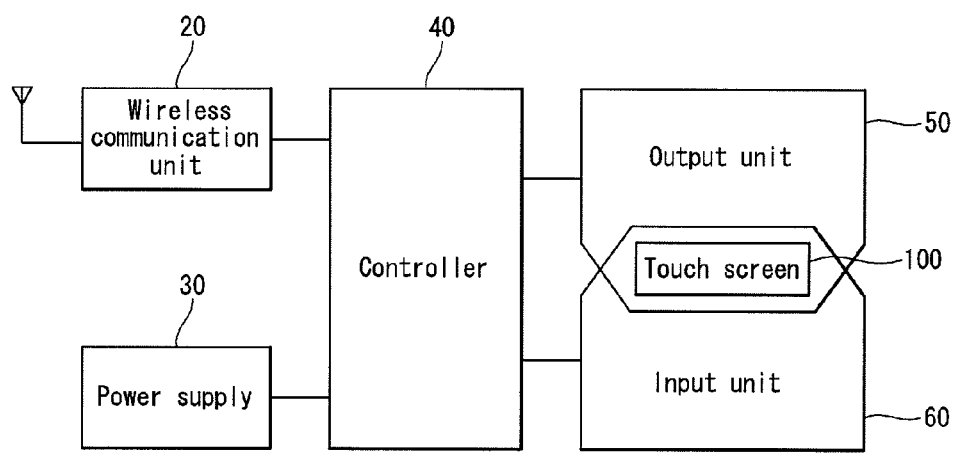
FIG. 5 is a block diagram of the mobile terminal according to an embodiment of the present invention.

FIG. 5 is a block diagram of the mobile terminal 10 according to an embodiment of the present invention. The mobile terminal 10 of FIG. 5 can be any mobile terminal discussed herein including the mobile terminal of FIGS. 1-4.

Referring to FIG. 5, the mobile terminal 10 according to an embodiment of the present invention may include a wireless communication unit 20, an input unit 60, an output unit 50, a controller 40, a power supply 30 and a touch screen 100. The mobile terminal 10 also includes additional components which may be known such as a storage unit, an audio unit, etc. All components of the mobile terminal 10 according to various embodiments are operatively coupled and configured.

The wireless communication unit 20 may include at least one module for enabling wireless communication between the mobile terminal 10 and a wireless communication system or wireless communication between the mobile terminal 10 and a network in which the mobile terminal 10 is located. For example, the wireless communication unit 20 may include one or more of a broadcast receiving module, a mobile communication module, a wireless Internet module, a local area communication module and a position information module.

The input unit 60 receives input data for controlling the operation of the mobile terminal 10, input by a user. The input unit 60 may be implemented using one or more of a key pad, a dome switch, a jog wheel or a jog switch as well as a constant voltage type touch pad or a capacitive touch pad.

The output unit 50 generates visual, auditory and/or tactile outputs. The output unit 50 may include an audio output module, an alarm and a reaction module in addition to the touch screen 100.

The controller 40 controls the overall operation of the mobile terminal 10. For example, the controller 40 may perform control and processing with respect to voice communication, data communication and video communication. The controller 40 may include a multimedia module for multimedia reproduction. Furthermore, the controller 40 may carry out pattern recognition for respectively recognizing handwriting inputs and drawing inputs applied to the touch screen as characters and images.

The power supply 30 receives external power and internal power under the control of the controller 40 and provides power to the components of the mobile terminal 10 to operate.

The touch screen 100 may be mounted in the front side of the body (e.g., the body 70 shown in FIG. 1). The touch screen 100 may display information and other data. Furthermore, the touch screen 100 may display information such that a user can select specific information. The touch screen 100 may be constructed by assembling a display panel and a touch panel. For example, the touch screen 100 can be constructed in such a manner that a touch panel capable of receiving touch inputs is mounted on a display panel composed of, e.g., LCD or OLED. Furthermore, the display panel and the touch panel may be integrated to produce the touch screen 100. Resistant, capacitive, infrared and ultrasonic touch panels can be used for the touch screen. Among these touch panels, the capacitive touch panel senses a variation in the capacitance between conductive layers included in the touch panel to recognize a touch input. The capacitive touch panel may include two conductive layers, an insulating substrate and a passivation layer, which is not shown in the drawings. Furthermore, the capacitive touch panel may further include a shield layer for improving a signal-to-noise ratio. The touch screen 100 may be the output unit 50 and the input unit 60 because the touch screen 100 includes the display panel displaying images and the touch panel receiving touch inputs.

Figure 6:
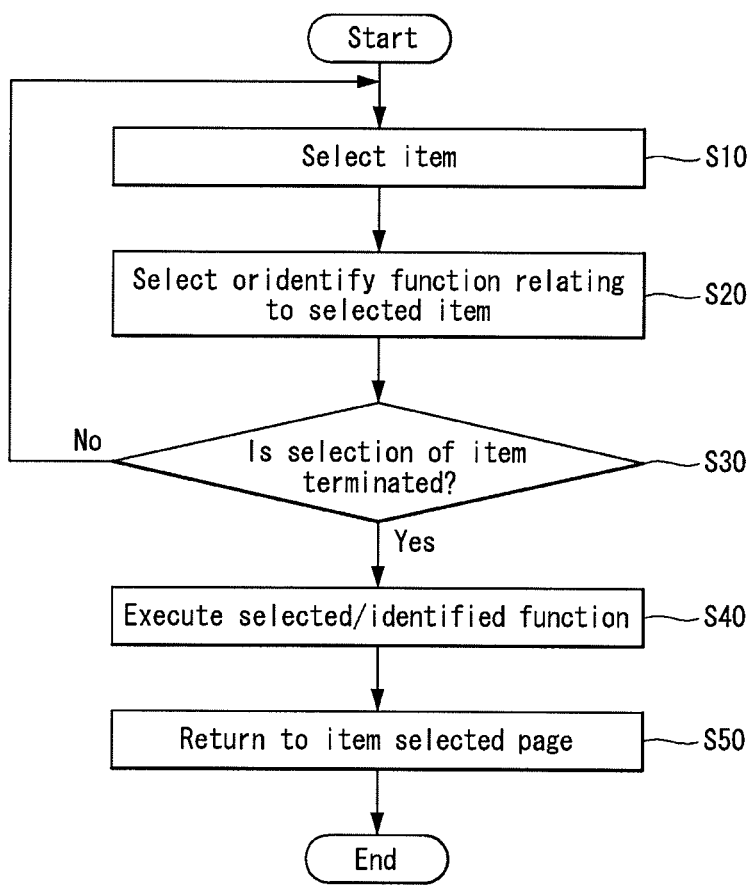
FIG. 6 is a flowchart showing an operation of the mobile terminal shown in FIG. 5 according to an embodiment of the present invention.

FIG. 6 is a flowchart showing an operation of the mobile terminal shown in FIG. 5 or in other figures.

Referring to FIG. 6, the operation of the mobile terminal 10 may include an item selecting step S10.

In step S10, items may be various image information items displayed on the touch screen 100 shown in FIG. 5. For example, the items may be contents displayed on the touch screen 100 shown in FIG. 5 through a control operation of the controller 40 shown in FIG. 5. The mobile terminal 10 shown in FIG. 5 can visually transmit information to a user through the displayed items. The items that are displayed on the touch screen may include various contents, for example, texts, pictures, web pages, moving pictures, buttons, menus, icons, images, etc. Depending on the items, the user can select, by touching (direct or proximity) the touch screen or using physical buttons on the mobile terminal, one or more of the displayed items to perform one or more functions corresponding to the selected item(s).

Figure 8:
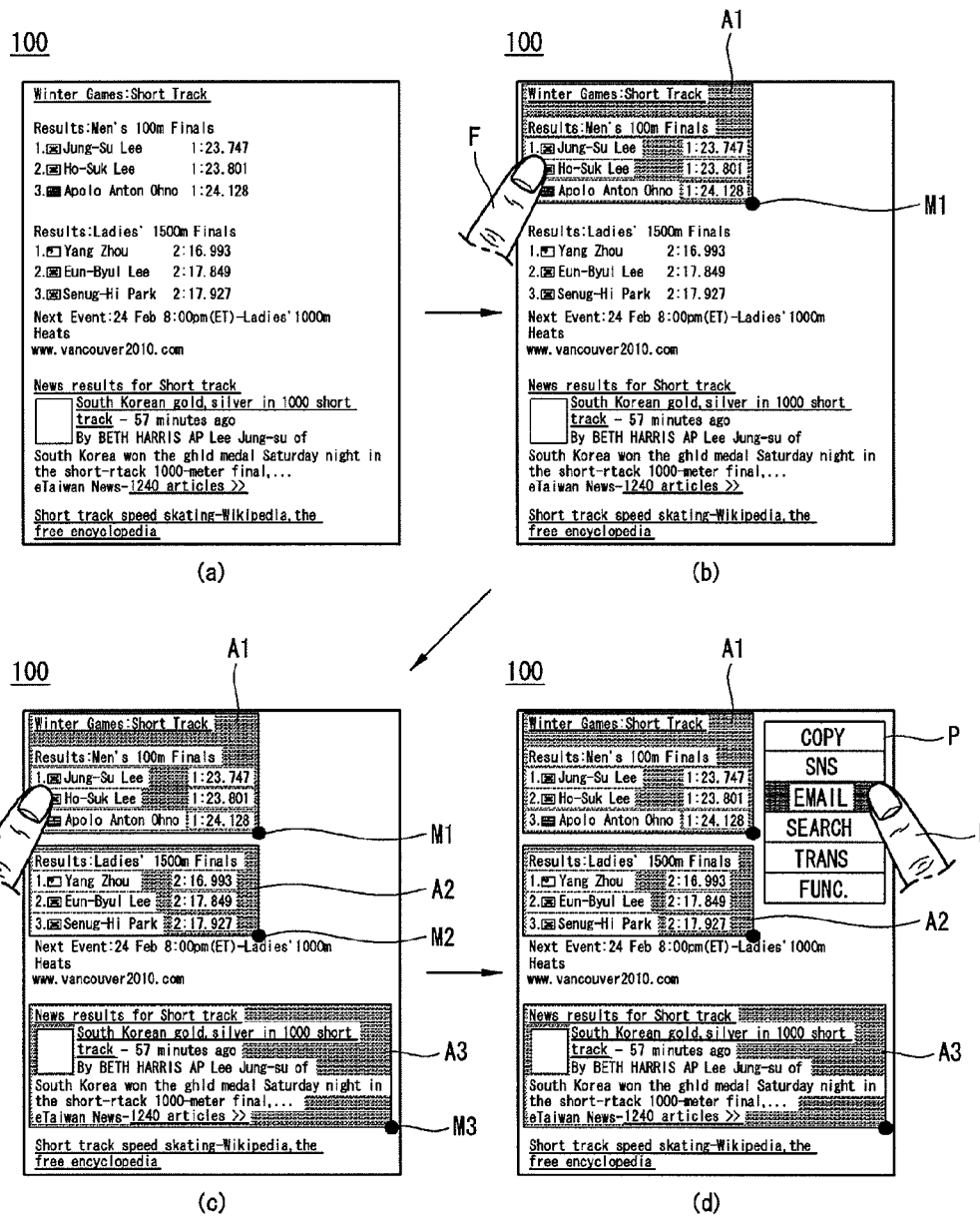

By selecting a certain item that is displayed on the screen 100, the user can initiate or trigger a function relating to the selected item to be performed (e.g., automatically or upon a further selection of the function) in step S20. For instance, after an item is selected in step S10, the touch screen in step S20 may further automatically display selectable functions that correspond to the selected item from which the user can select, or may merely and automatically identify one or more functions that have been pre-assigned to the selected item for execution without further input As mentioned, the selected item may have a function relating thereto. For example, when a picture (or an icon representing the picture) displayed on the touch screen 100 is selected by the user, there may be one or more functions that correspond/relate to the selected item such as a function of magnifying and displaying the selected picture, a function of editing the picture and an e-mail function of affixing the picture to the e-mail and transmitting the mail. The user can select one or more of such function(s) relating to the selected item by viewing a pop-up window (e.g., P shown in FIG. 8) and selecting a desired item in the pop-up window.

The controller 40 determines whether or not the selection of the item and/or function is completed in step S30.

In the above steps, the user can select a plurality of items displayed on the touch screen 100. The selected items may have different attributes. For example, the user can simultaneously select two pictures and two texts displayed on a single screen of the terminal.

After step S30 determines that all desired item(s)/function(s) have been selected, the function(s) selected or identified are executed by the mobile terminal in step S40.

As described above, a function corresponding to a selected item can be selected by the user or mobile terminal. Accordingly, after the user selects the item, the function corresponding to the selected item can be executed.

When the execution of the function corresponding to the selected item is completed, the screen of the mobile terminal returns to the item selecting screen in step S50. For instance, after the execution of the function has been completed, the mobile terminal displays the screen that was previously displayed before the execution of the function execution or the screen for selecting the items. This can be provided by storing information on the selected items in a storage unit of the mobile terminal and then retrieving the same after the execution of the function(s) corresponding to the selected item(s). Then the same retrieved information or a modification as needed may be displayed on the screen. In another example, the initial page (or the item selected page) may be stored in the mobile terminal as a background page and after the execution of the applicable function(s), the background page may be re-displayed as the foreground page on the screen of the mobile terminal.

At this time, according to the invention, even after the item selecting screen is recovered or re-displayed on the screen of the mobile terminal, the item selecting state (e.g., the previously-selected state of the item(s)) can be maintained and displayed to indicate the selected state. For example, when a plurality of items are selected on the screen at one time by the user, functions corresponding to the selected items may occur sequentially. When a function corresponding to one of the selected items is executed, the screen returns to the previous page which displays the selection of the other items as maintained. As a variation, all previously selected items including the item who function has just been performed may be shown as selected. The item selecting screen is recovered/re-displayed when the execution of the function is terminated or the execution of a function in the foreground is changed to the execution of the function in the background in a multi-tasking environment. Here, the execution of the function in the foreground may preferably mean that the function has priority higher than those of other functions simultaneously executed so that the execution state of the function is displayed on the touch screen 100. The execution of the function in the background may preferably mean that the function has priority lower than those of the other functions simultaneously executed so that the execution state of the function is not displayed on the touch screen 100. Thus, by maintaining the selection of items on the screen when the screen returns to the previous page upon executed of the function(s), the user does not need to make the same selections of the items that were previously selected but were not executed. As such, the inconvenience of having to repeat selecting the items on the screen can be mitigated. For example, if a picture and a text are selected on the screen 100 and an editing function with respect to the picture is executed by the mobile terminal, the initial/previous screen can be recovered and re-displayed when the editing function is terminated. Here, according to a related art, the selection of the picture and the text is cancelled and is not maintained on the screen, and as a result, the user must re-select the picture and the text again, which is inconvenience and time consuming. However, the mobile terminal 10 according to an embodiment of the present invention addresses these limitations by maintaining the selection of the picture and the text on the returning screen even after the editing function is executed. Below are various examples of the invention which are provided only to enhance understanding of the invention and are not to limit the invention.

Figure 7:
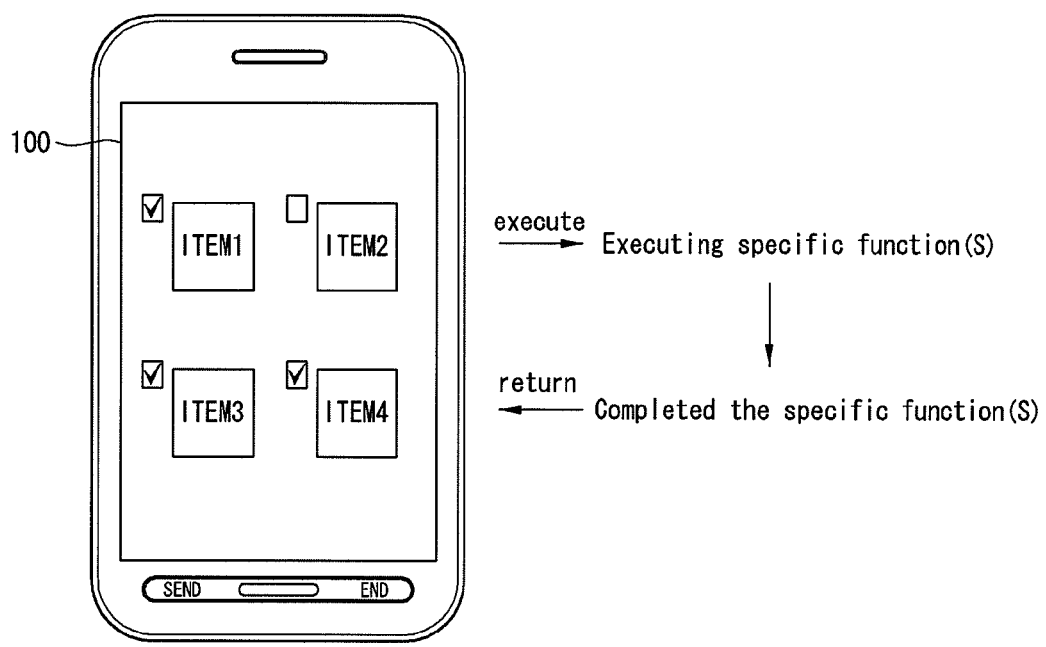
FIG. 7 illustrates an example of an operation of the mobile terminal shown in FIG. 6 according to an embodiment of the present invention.

FIG. 7 illustrates an example of the operation of the mobile terminal shown in FIG. 6 according to an embodiment of the invention.

Referring to FIG. 7, the touch screen 100 of the mobile terminal 10 may display first, second, third and fourth selectable items ITEM1, ITEM2, ITEM3 and ITEM4. The first, second, third and fourth items ITEM1, ITEM2, ITEM3 and ITEM4 may be one or more of picture files, text files, clips, website address or URL, etc.

The user can select one or more items from the displayed selectable first, second, third and fourth items ITEM1, ITEM2, ITEM3 and ITEM4 through touching operation(s). For example, the user can select the first, third and fourth items ITEM1, ITEM3 and ITEM4 by, e.g., touching the box icons next to ITEM1, ITEM3 and ITEM4 displayed on the touch screen 100 (e.g., step S10 of FIG. 6). This page/screen displayed on the screen 100 as shown in FIG. 7 which shows the three items selected, is referred to herein as an "item selected page". Furthermore, the user can select specific function(s) corresponding to the selected item(s) (e.g., step S20 of FIG. 6). For instance, after the selection of the first, third and fourth items, the user may select a function of displaying the selected items on the touch screen 100 by selecting a "Display" command though a pop-up window. Then the touch screen 100 switches from the item selected page (or any subsequent page for selecting a function) to a new page which displays the contents of the three selected items, namely ITEM1, ITEM3 and ITEM4.

After the specific functions (e.g., Display command) selected by the user are executed and completed (e.g., steps S30 and S40 of FIG. 6), the screen 100 returns to the item selected page of FIG. 7 which displays the first, second, third and fourth items ITEM1, ITEM2, ITEM3 and ITEM4 with the previous selection of the first, third and fourth items ITEM1, ITEM3 and ITEM4 maintained (e.g., step S50 of FIG. 6). As such, the user does not need to re-select the items ITEM1, ITEM3 and ITEM4 and can merely select a different function for the selection-maintained items. As a variation, if only the function of displaying the selected ITEM 3 is performed while functions for the selected ITEMS 1 and 4 have not been performed, then upon completion of the function of displaying the selected ITEM 3, the screen may return to the page having only the ITEMS 1 and 4 shown to be still selected. Accordingly, it is possible to mitigate the inconvenience of repeatedly having to select items to execute certain functions associated with these items on the mobile terminal 10.

FIGS. 8(a) through 16 illustrate various examples of the operations of the mobile terminal 10, shown in FIG. 6, according to examples of the present invention.

As shown in FIGS. 8(a) through 16, the mobile terminal 10 according to an embodiment of the present invention can maintain the selection of one or previously-selected items even after function(s) corresponding to the selected item(s) have been executed and completed.

Referring to FIG. 8(a), the touch screen 100 of the mobile terminal may display a web page. Various information items some of which may be selectable may be displayed in the web page in various manners. For example, information may be displayed in the form of a text or a picture. When the information is displayed in the form of a text, the information may be displayed in the form of a simple text or a linked text.

Referring to FIG. 8(b), the user can select a specific item (or a portion of the displayed web page/content) using a finger F. For example, the user can select a first area A1 to choose a text item included therein. The text item may be selected by touching a specific point to select a text in a specific range around the specific point. For example, when the center of the first area A1 is touched for longer than a predetermined time, a paragraph (or a pre-designated portion of contents) having the touched point at the center or other designated location may be selected. In another example, the text item may be selected in such a manner that the user draws a closed curve with his/her finger F to select a text included in the closed curve.

When the user selects the specific item through the touching operation on the touch screen 100, the selected item may be displayed differently from unselected items. For example, the region around the selected item may be hatched or a line surrounding the selected item may be displayed. Furthermore, a first marker M1 may be displayed to represent that the selection of the item is maintained according to the present invention. When the first marker M1 is displayed, the user can be intuitively aware of that the selection of the item (A1) will be maintained even after the functions other than the function of the item are executed and the initial screen is recovered.

Referring to FIG. 8(c), the user can select a plurality of items. That is, the user can select the first area A1 to choose the text item included therein as shown in FIG. 8(b), then select a second area A2 to choose a text item included therein and then select a third area A3 to choose text and picture items included thereon. Furthermore, the controller (40 shown in FIG. 5) may respectively display first, second and third markers M1, M2 and M3 in the selected first, second and third areas A1, A2 and A3 to represent that selection of the items included in the first, second and third areas A1, A2 and A3 will be continuously maintained (and shown as maintained) even after function(s) corresponding to the selected item(s) are performed.

Referring to FIG. 8(d), the user can select a specific function to be applied to the selected item(s). Function(s) relating to the selected item(s) may be displayed in at least one pop-up window P. The user can select the specific function from the function(s) displayed in the pop-up window P. For example, the user can select a function of affixing the contents of the selected first area A1 to an e-mail. The functions displayed in the pop-up window P may relate to the selected item. For example, certain functions that can be applied to the selected item may be displayed in consideration of the attributes of the selected item. In an example, if the selected item is a text, a list of functions which may be displayed in the pop-up window for selecting may include copying the selected text, transmitting the selected text to a social network service (SNS), searching information about the text and translating the text, etc. The user may select desired function(s) from the displayed selectable functions to execute the selected function(s). The selectable functions displayed in the pop-up window P may be varied according to the attributes of the selected item. For example, a translating function may be displayed when the selected item includes a text, whereas an image editing function may be displayed when the selected item includes a picture. The number of times specific functions may be selected may correspond to the number of selected items. In one example, a single pop-up window having a list of possible selectable functions may be displayed for all selected items if feasible so that one selected function may be applied to all selected items as feasible. In another example, each pop-up window having a list of possible selectable functions may be displayed for each of the selected items so that functions for each selected item may be performed. In the example of FIG. 8(d), the user has selected the email function from the displayed pop-up window P for emailing the selected item/area A1.

Then, referring to FIG. 9(a), the user may affix the first area A1 including the selected item to an e-mail according to the selected function.

Referring to FIG. 9(b), the user may then end the creation of e-mail and select a transmission button to transmit the email with the first area A1 content attached thereto. When the execution of the specific function corresponding to the selected item is completed (e.g., after the email has been sent in FIG. 9(b)), the touch screen 100 returns to the initial screen/page or the item selected page. Here, the initial page (or the page that the screen 100 returns to after the function has been completed may be the page as shown in FIG. 9(c), which is the page identical to that of FIG. 8(c) except that the item/area A1 has now been deselected since its corresponding function has just be completed, or as shown in FIG. 9(d) which is identical to the page of FIG. 8(c) displaying all the previously selected items. That is, the selection of items is maintained even after function(s) corresponding to the selected item(s) have been performed.

Figure 9:
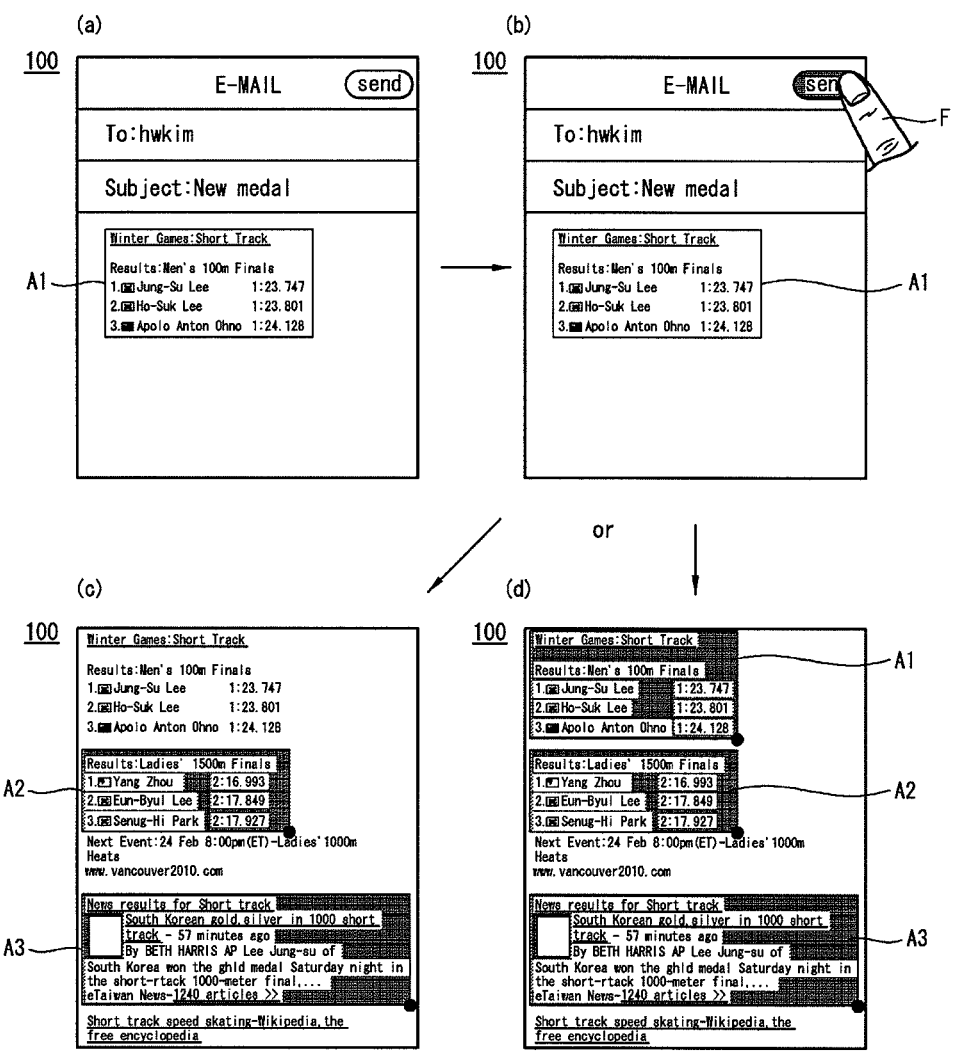
Figure 10:
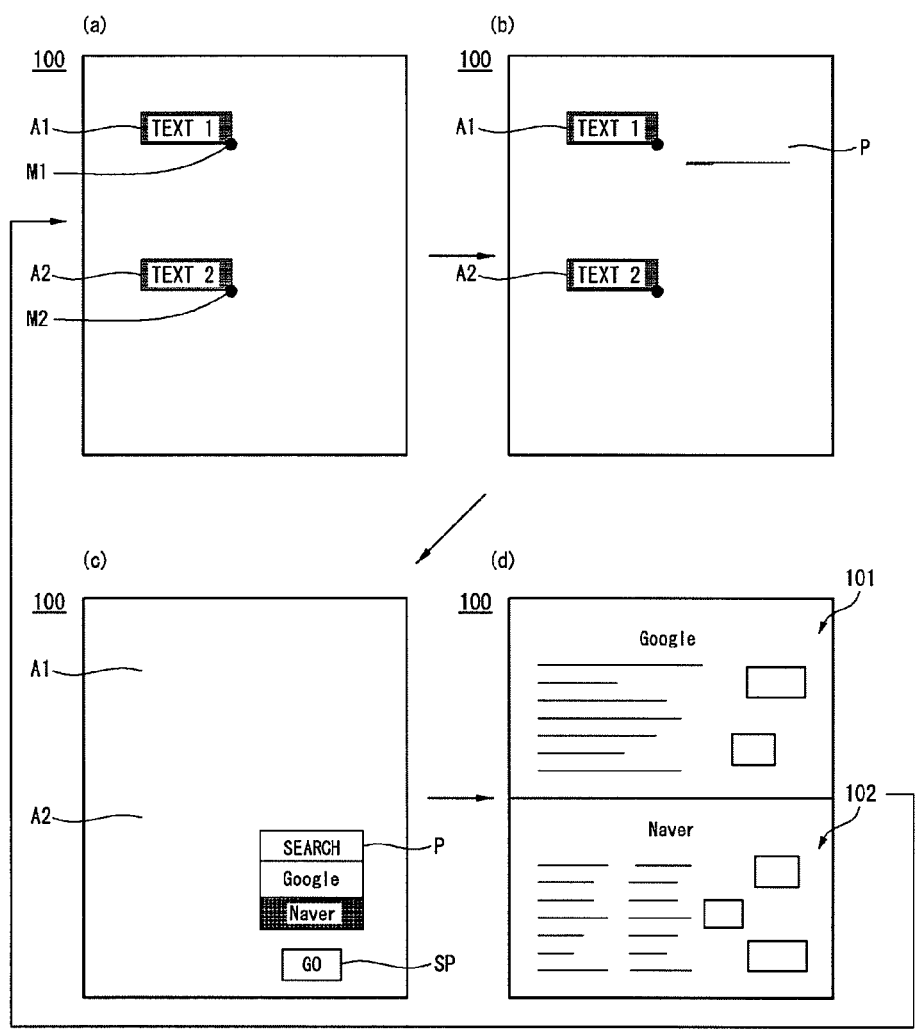

More specifically, referring to FIG. 9 (c), the recovered initial screen may display the selection of only the second and third areas A2 and A3. For example, the selection of the first area A1 for which the e-mail function has been executed is cancelled. When a function relating to a selected item has been already executed, a probability of re-executing the function for the item can be low, and thus the selection of an area including the item may be cancelled or removed as needed. In a variation, referring to FIG. 9(d), the recovered initial screen may be identical to the screen displayed before the function is executed. For example, the selection of the first, second and third areas A1, A2 and A3 can be maintained even after the execution of the e-mail function.

In another example, referring to FIG. 10(a), the user can select first and second text items TEXT1 and TEXT2 displayed on the touch screen 100 of a mobile terminal. When the user selects the first and second text items TEXT1 and TEXT2, areas A1 and A2 including the selected text items TEXT1 and TEXT2 may be hatched to allow the user to see or recognize the selection of the first and second text items TEXT1 and TEXT2 as shown. Furthermore or in the alternative, first and second markers M1 and M2 may be respectively displayed on the selected first and second text items TEXT1 and TEXT2 so that the user can visually know the items that have been selected to be maintained.

Referring to FIG. 10(b), the user can select a search function relating to the first text item TEXT1 through a pop-up window P, e.g., by touching a search item displayed in the pop-up window P. In addition, the user can select a search engine to execute the search function.

Then, referring to FIG. 10(c), the user can select a search function using another search engine as a function relating to the second text item TEXT2 through a pop-up window P. When the selection of the first and second text items TEXT1 and TEXT2 and selection of the functions relating to the first and second text items TEXT1 and TEXT2 have been made (and no other item is to be selected), the user can select an execution button SP (e.g., "GO") for executing the selected functions.

In that case, referring to FIG. 10(d), the search functions for the selected items TEXT1 and TEXT2 are performed and search results respectively corresponding to the selected first and second text items TEXT1 and TEXT2 may be respectively displayed on logically divided regions of the touch screen 100. For example, the search result corresponding to the first text item TEXT1 may be displayed in a first screen area 101 of the screen 100 and the search result corresponding to the second text item TEXT2 may be displayed in a second screen area 102 of the screen 100. Thereafter, if a previous page is selected by the user or an item/button for displaying an item selecting page is selected by the user, then the screen returns from the page of FIG. 10(d) to the page of FIG. 10(c) with the selection of the items as maintained.

Figure 11:
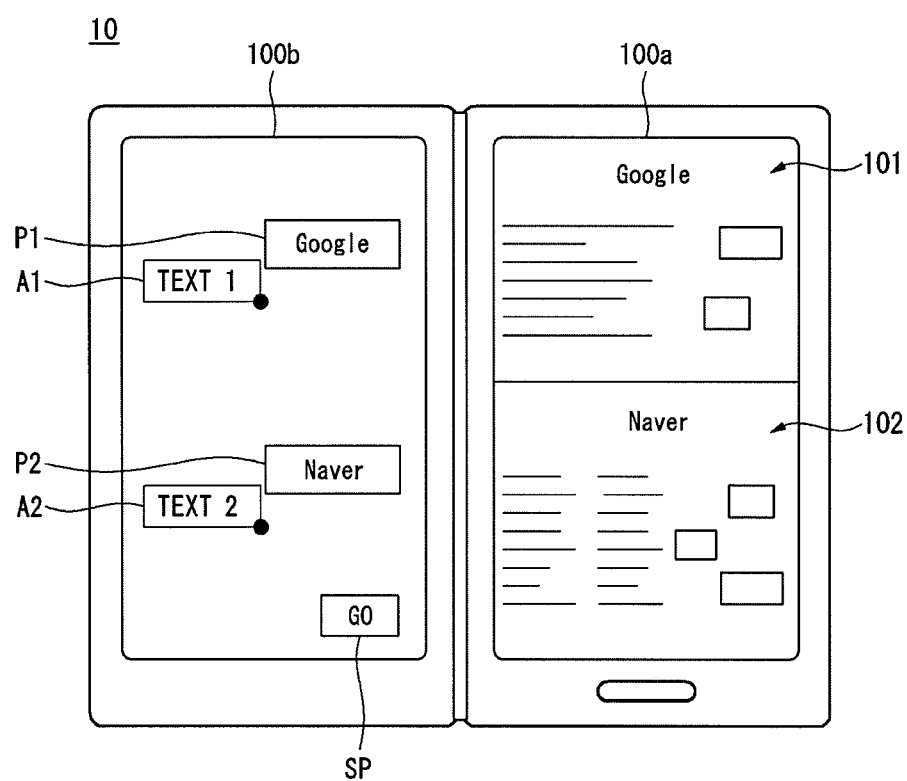
Figure 12:
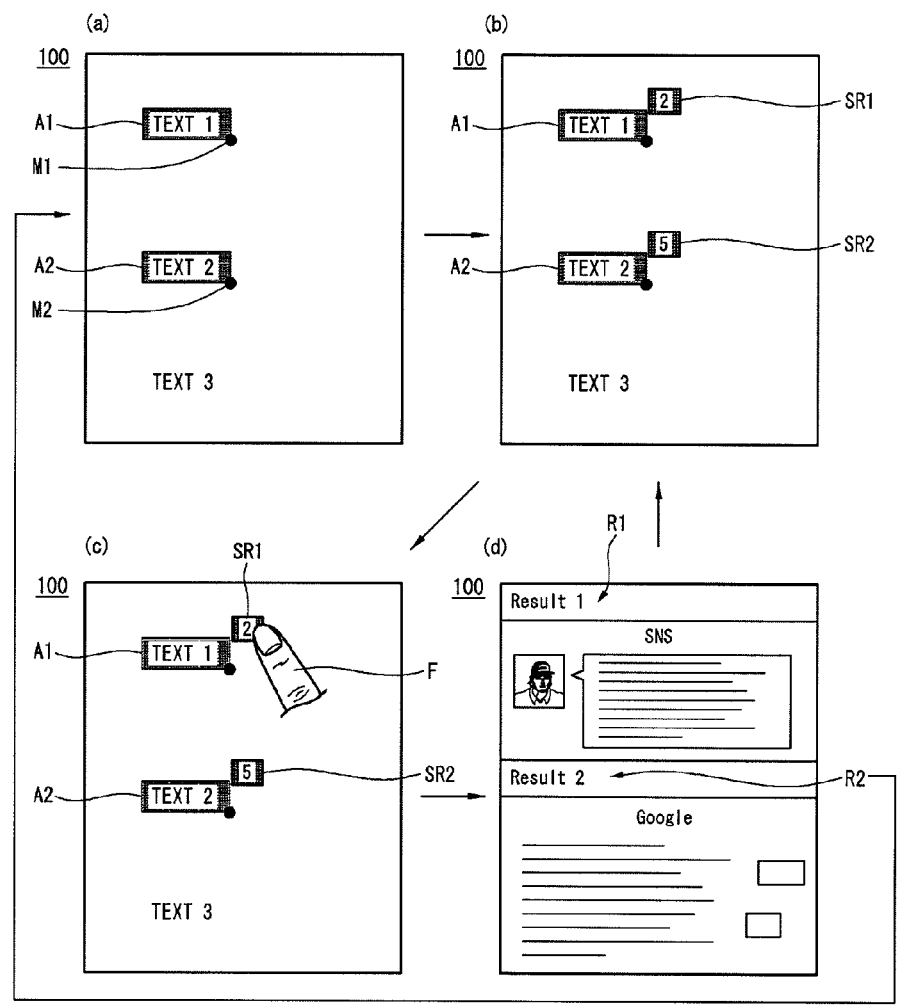
Figure 13:
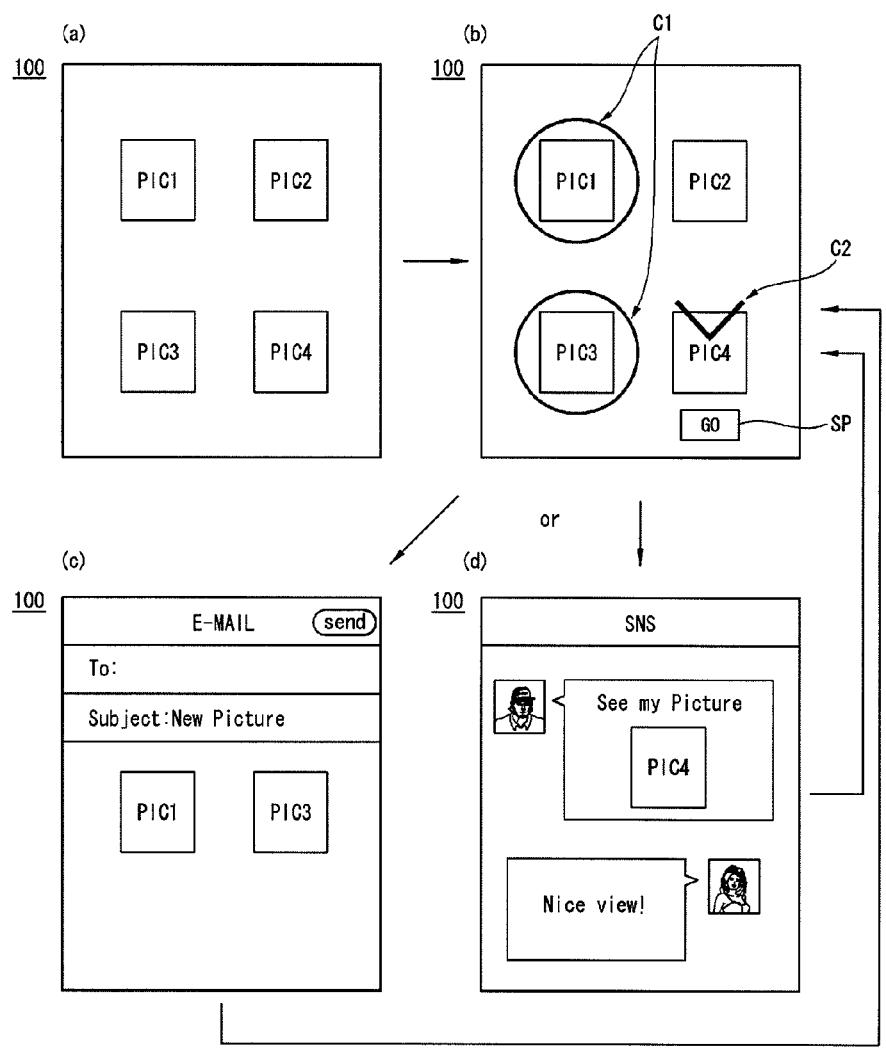
Figure 14:
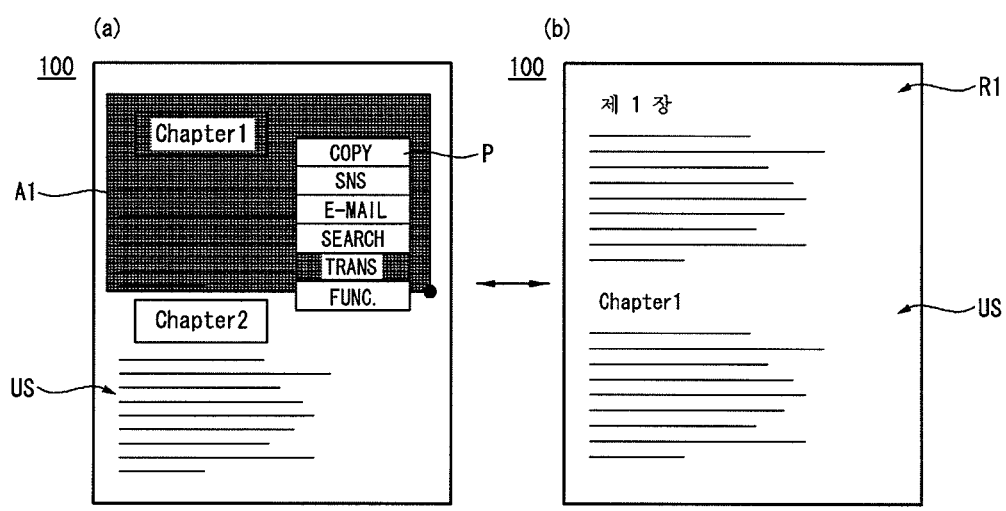
Figure 15:
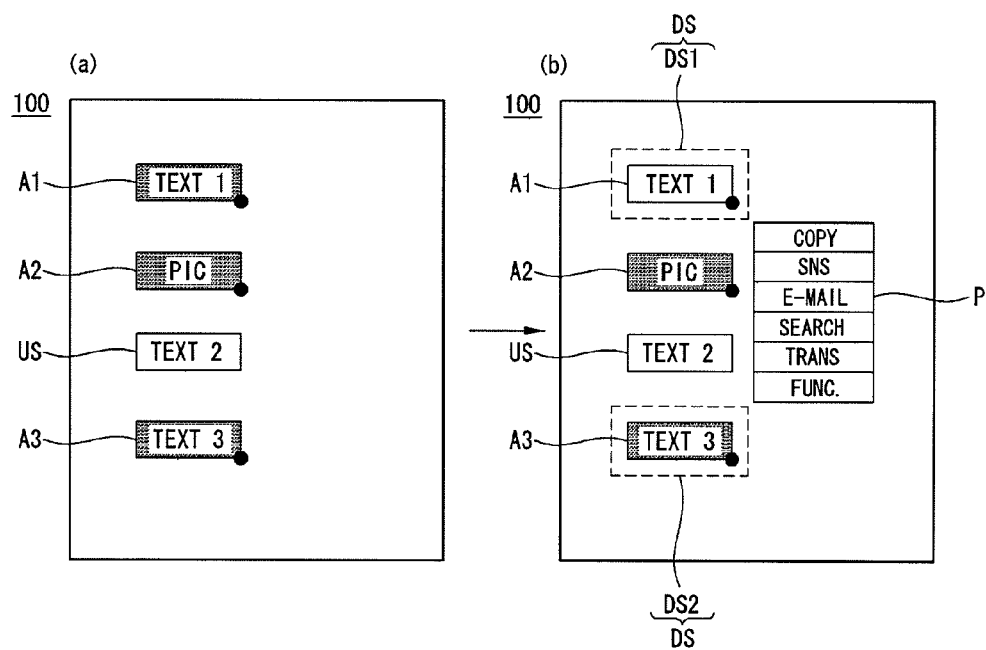
Figure 16:
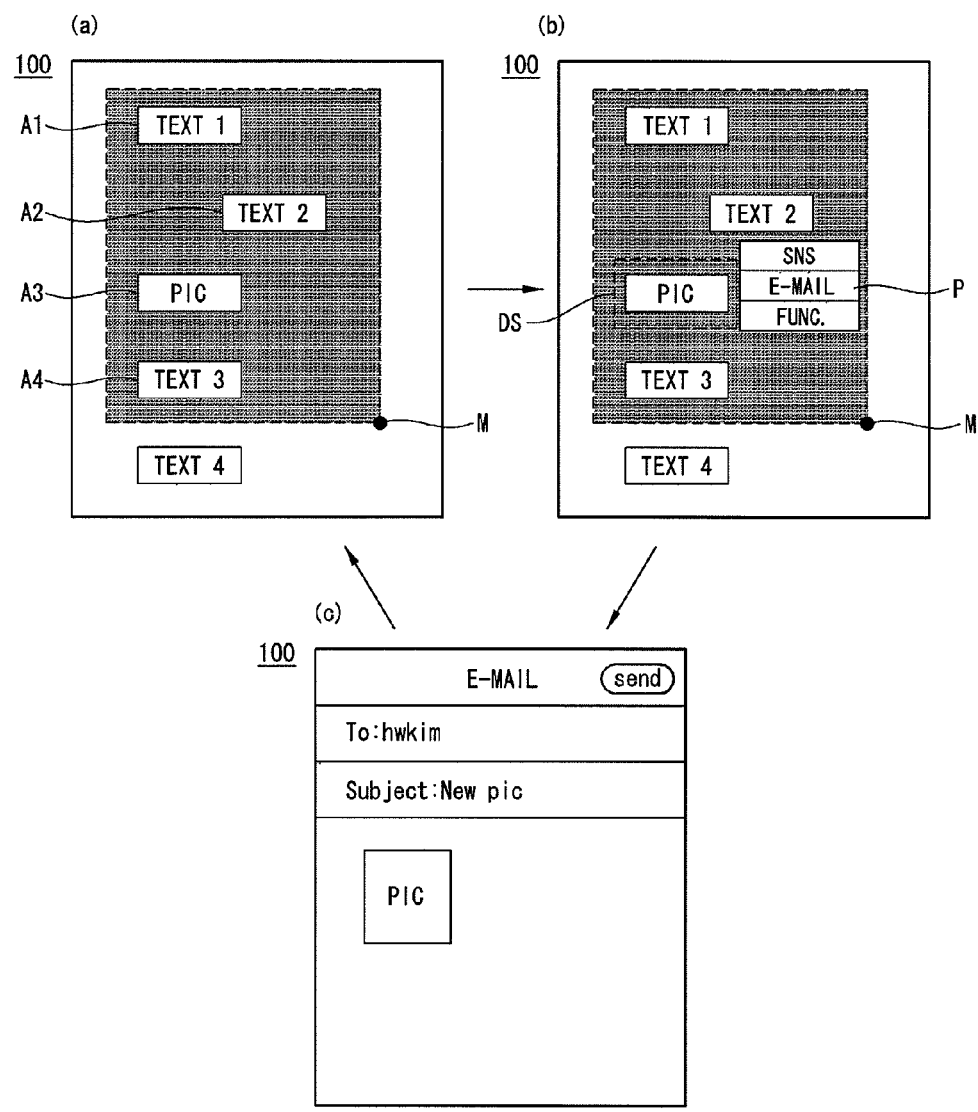

In another variation, referring to FIG. 11, a the search results corresponding to the selected first and second text items TEXT1 and TEXT2 may be displayed on a first touch screen 100b physically separated from a second touch screen 100b of a mobile terminal. Furthermore, the second touch screen 100a may be logically divided into the first screen area 101 and the second screen area 102 for respectively displaying the corresponding search result. In this case, when the search results are displayed on the second touch screen 100a upon completion of the search function, the marks indicating that the first and second texts TEXT1 and TEXT2 are still maintained as selected are displayed on the first touch screen 100b at the same time.

In still another example, referring to FIG. 12(a), the user can select the first and second texts TEXT1 and TEXT2 on the touch screen 100 of a mobile terminal.

Referring to FIG. 12(b), result values SR1 and SR2 representing search results of contents relating to the selected first and second texts TEXT1 and TEXT2 may be displayed with the first and second texts TEXT1 and TEXT2. For instance, after the search has been performed for the selected item, a pop-up window may be displayed to the user, asking if the user would like to save the search result in association with the selected item. If the user agrees, then the search result for the selected items may be stored and displayed in association as shown in FIG. 12(b).

Then referring to FIG. 12(c), the user can select the first result value SR1 corresponding to the first text TEXT1 using a finger F.

Then referring to FIG. 12(d), contents corresponding to the first result value SR1 selected by the user can be displayed on the touch screen 100. For example, search results corresponding to the first text TEXT1 may include first and second results R1 and R2, as represented by the first result value SR1. Here, the fact that the first result R1 relates to social network service and the second result R2 is searched by a search engine may be displayed on the touch screen 100. If the user selects the second result value SR2, five search results corresponding to the second result value SR2 may be displayed on the touch screen 100. Thereafter, if a previous page is selected by the user or an item/button for displaying an item selecting page is selected by the user, then the screen returns from the page of FIG. 12(a) or 10(b) with the selection of the items as maintained.

In still another example, function(s) pre-designated for the selected items may occur automatically without the user's selection of such functions. For instance, referring to FIG. 13(a), the touch screen 100 of a mobile terminal may display first, second, third and fourth pictures PIC1, PIC2, PIC3 and PIC4 which are selectable items.

Referring to FIG. 13(b), the user can select the first, third and fourth pictures PIC1, PIC3 and PIC4 through touching operations. Here, a selecting operation of the user may correspond to a specific function. For example, the user may select the first and third pictures PIC1 and PIC3 through a first drag operation (C1) that circles each of the first and third pictures PIC1 and PIC3 and select the fourth picture PIC4 through a second drag operation C2 that touches the fourth picture PIC4 in the form of "V". The user may, using the finger, draw a circle around PIC1 and PIC3 to select PIC1 and PIC3, and may draw using the finger a check mark around PIC4 to select PIC4. Here, the first drag operation C1 may be linked to a function of affixing an item selected through the first drag operation C1 to an e-mail and the second drag operation C2 may be linked to a function of affixing a selected item to a social network service. Thus, when the user selects an execution button SP on the screen of FIG. 13(b), the mobile terminal may automatically perform pre-assigned function for the selected item, namely, the function of attaching the selected item (PIC1 and PIC3) to an email, and the function of attaching the selected item (PIC4 to the SNS website. In this manner, it is possible to select an item through a predetermined touching operation so as to omit an operation of selecting a function corresponding to the selected item. When the selection of the item is completed, the user can select the execution button SP to execute a selected function corresponding to (pre-designated to) the selected item.

Referring to FIG. 13(c), the user can affix the first and third pictures PIC1 and PIC3 selected through the first drag operation C1 to the e-main without performing an additional function selecting operation. In a variation, referring to FIG. 13(d), the user can affix the fourth picture PIC4 selected through the second drag operation C2 to a social network service without executing an additional function selecting operation. Here, when the SP button is selected in FIG. 13(b), the functions of FIGS. 13(c) and 13(d) may occur sequentially. As a variation, in the page of FIG. 13(b), the user may further select which of the selected items may be designated so that its corresponding function is to be performed next. This can occur via a pop-up window or other designated button. After the function in FIG. 13(c) or 13(d) has been completed (e.g., the email has been sent or the picture has been displayed in the SNS), the screen may automatically return to the page of FIG. 13(b) with the selection of the items is still maintained on the screen.

In still another example, referring to FIG. 14(a), the user can select the first area A1 from text items displayed on the touch screen 100. Then, the user can select a function of translating a text corresponding to the first area A1 through a pop-up window P.

Then referring to FIG. 14(b), a result R1 (translation) may be displayed on the touch screen 100. For example, the selected text in 'English' may be translated into a text in 'Korean' and both the selected text in English and the corresponding Korean translation may be displayed on the screen 100 simultaneously. The translating function may be executed only for the first area A1 selected by the user and may not be performed for an area US unselected by the user. Here, the screen shown in FIG. 14(b) may be returned to the initial screen shown in FIG. 14(a) (e.g., via a selection of a previous page or other designated command) to view the original text, where the first area A1 is maintained in the selected state. As such, the user does not need to select the first area A1 again, but instead can use a pop-up window P (e.g., which may pop-up by right-clicking the marker or selected item) to perform a different function (e.g., COPY function) for the selected first area A1, which is convenient and efficient.

Referring to FIG. 15(a), the user can select a plurality of items in different categories on the touch screen of the mobile terminal. For example, the user can select first and third texts TEXT1 and TEXT3 as selected text items and select a picture PIC as a selected picture item.

To perform a function for all the selected items that may fall into a same category, referring to FIG. 15(b), the user can select again at least one of the selected items in the same (or similar) category from the selected items. For example, the user can select the first and third items TEXT1 and TEXT3 again. When the user select the items in the same (or similar) category, a pop-up window P corresponding to the plurality of items may be displayed. That is, a single pop-up window P may be displayed for all the plurality of selected items that fall in the same category and a specific function selected through the displayed pop-up window P may be executed for all the plurality of selected items that belong to the same (or similar) category. Here, a double selection DS that indicates that the first and third texts TEXT1 and TEXT3 are double selected may be displayed on the screen. After the selected function for all the selected items that fall to the same or similar category has been performed, the screen may automatically return to the page of FIG. 15(a) or may return to the page of FIG. 15(a) upon further command. In either case, the items previously selected are maintained as selected even after the functions have been completed. As such, the user need not re-select the items after the function has been performed, and can merely use the pop-up window to perform other functions as desired on the previously-selected items.

In still another example, referring to FIG. 16(a), the user can simultaneously select the first, second and third texts TEXT1, TEXT2 and TEXT3 and the picture PIC on the touch screen 100 of a mobile terminal. For example, the user can simultaneously select items included in first, second, third and fourth areas A1, A2, A3 and A4.

Then referring to FIG. 16(b), the user can select a specific item again from the selected items and choose a specific function for the twice-selected item. For example, the user can select the picture PIC again (twice selected) and choose a function through the displayed pop-up window P so that the selected function may apply to only the twice selected item. Here, a marker M indicates the selection of the items TEXT1, TEXT2, TEXT3 and PIC and a double selection DS indicates a double selection (twice selection) of the item PIC. Here these indications, M and DS, may be displayed on the screen 100 for the user's recognition.

Thereafter, referring to FIG. 16(c), the function selected by the user may be executed. For example, if the email function is selected for the twice-selected item PIC, then the email page is displayed with the twice selected PIC as attached. The user then scan finish composing the email and send the email. When the execution of the selected function is completed (e.g., when the email has been sent by the mobile terminal), the screen of the mobile terminal may return to the initial screen shown in FIG. 16(a). with the selection of the items as maintained, as described above.

In the aforementioned embodiments and examples, texts and pictures are described as selectable items. However, the present invention can be applied to other examples, e.g., any images that can be displayed on the mobile terminal may be selected irrespective of the display forms of the images. Also, the selectable items according to the present invention may be texts, pictures, data, contents, symbols, icons, websites, etc. The selectable items may also be functions or items including functions.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A mobile terminal comprising:
a display unit including a screen; and
a controller configured to control the display unit and configured to:
display, on the screen, a first page including a plurality of selectable items including a first selectable item and a second selectable item, the first and second selectable items corresponding to at least two functions to be performed,
receive a user's selection of the first and second selectable items,
indicate, on the same first page in a predetermined manner, the user's selection of the displayed first and second selectable items,
perform a first function corresponding to the first selectable item, wherein the performing the first function includes switching from the first page to a second page on the screen, the second page being different from the first page, and wherein the second page includes a function related to at least one of the selected items, and
after the first function is performed, switch from the second page back to the first page on the screen and then automatically display the first page maintaining the user's selection of the second selectable item indicated in the same predetermined manner while not maintaining the user's selection of the first selectable item with the corresponding first function having been performed.

2. The mobile terminal of claim 1, wherein after the controller displays the first page maintaining the user's selection of the second selectable item while not maintaining the user's selection of the first selectable item, the controller performs a second function corresponding to the second selectable item.

3. The mobile terminal of claim 2, wherein the performing the second function includes switching from the first page to a third page on the screen, and the third page includes a function related to the second selectable item.

4. The mobile terminal of claim 1, wherein upon receipt of the user's selection of the first and second selectable items, the controller is further configured to automatically display, on the display unit, at least one selectable function corresponding to the user's selection for execution.

5. The mobile terminal of claim 1, wherein the controller displays a pop-up window that displays at least one selectable function corresponding to the user's selection of the first and second selectable items.

6. The mobile terminal of claim 1, wherein each of the at least two functions corresponds to at least one of the following:
a function of copying contents associated with at least one of the first and second selectable items,
a function of affixing contents associated with at least one of the first and second selectable items to an e-mail,
a function of searching contents associated with at least one of the first and second selectable items,
a function of translating contents associated with at least one of the first and second selectable items, and
a function of playing or displaying contents associated with at least one of the first and second selectable items.

7. A method of controlling a mobile terminal including a display unit and a controller, the method comprising:
displaying, on a screen of the display unit, a first page including a plurality of selectable items including a first selectable item and a second selectable item, the first and second selectable items corresponding to at least two function to be performed;
receiving a user's selection of the first and second selectable items;
indicating, on the same first page in a predetermined manner, the user's selection of the displayed first and second selectable items;
performing a first function corresponding to the first selectable item, wherein the performing the first function includes switching from the first page to a second page on the screen, the second page being different from the first page, and wherein the second page includes a function related to at least one of the selected items; and
after the first function is performed, switching from the second page back to the first page on the screen and then automatically displaying the first page maintaining the user's selection of the second selectable item indicated in the same predetermined manner while not maintaining the user's selection of the first selectable item with the corresponding first function having been performed.

8. The method of claim 7, wherein after the step of displaying the first page maintaining the user's selection of the second selectable item while not maintaining the user's selection of the first selectable item, the method further comprises performing a second function corresponding to the second selectable item.

9. The method of claim 8, wherein the performing the second function includes switching from the first page to a third page on the screen, and the third page includes a function related to the second selectable item.

10. The method of claim 7, further comprising:
upon receipt of the user's selection of the first and second selectable items, automatically displaying, on the display unit, at least one selectable function corresponding to the user's selection for execution.

11. The method of claim 7, further comprising:
displaying, on the display unit, a pop-up window that displays at least one selectable function corresponding to the user's selection of the first and second selectable items.

12. The method of claim 7, wherein each of the at least two functions corresponds to at least one of the following:
- a function of copying contents associated with at least one of the first and second selectable items,
- a function of affixing contents associated with at least one of the first and second selectable items to an e-mail,
- a function of searching contents associated with at least one of the first and second selectable items,
- a function of translating contents associated with at least one of the first and second selectable items, and
- a function of playing or displaying contents associated with at least one of the first and second selectable items.

13. The mobile terminal of claim 1, wherein the display unit comprises physically separated first screen and second screen,
wherein the controller is configured to display the first page on the first screen and the second page on the second screen.

14. The method of claim 7, wherein the performing step performs the first function at a different screen from the screen displaying the first page, wherein the screen displaying the first page and the different screen are physically separated.

15. The mobile terminal of claim 1, wherein each of the first and second selectable items includes at least one of text and picture, and
wherein the first function is at least one of an e-mail function, a searching function, and a social network service function.

16. The method of claim 7, wherein each of the first and second selectable items includes at least one of text and picture, and
wherein the first function is at least one of an e-mail function, a searching function, and a social network service function.

* * * * *